US007463599B2

(12) United States Patent
Lindoff et al.

(10) Patent No.: US 7,463,599 B2
(45) Date of Patent: Dec. 9, 2008

(54) METHOD AND APPARATUS FOR MINIMIZING TIME OF RECEPTION DURING PAGING

(75) Inventors: Bengt Lindoff, Bjärred (SE); Håkan Eriksson, Lund (SE)

(73) Assignee: Telefonaktiebolaget L M Ericsson (PUBL), Stockholm (SE)

( * ) Notice: Subject to any disclaimer, the term of this patent is extended or adjusted under 35 U.S.C. 154(b) by 944 days.

(21) Appl. No.: 10/150,037

(22) Filed: May 17, 2002

(65) Prior Publication Data

US 2003/0214937 A1    Nov. 20, 2003

(51) Int. Cl.
*G08C 17/00*    (2006.01)
(52) U.S. Cl. .................. 370/311; 370/310; 455/574; 455/522
(58) Field of Classification Search .......... 455/458, 455/502
See application file for complete search history.

(56) References Cited

U.S. PATENT DOCUMENTS

| 6,240,288 | B1 * | 5/2001 | Wan et al. ............. 455/426.1 |
| 6,421,540 | B1 * | 7/2002 | Gilhousen et al. .......... 455/458 |
| 6,650,912 | B2 * | 11/2003 | Chen et al. ............... 455/574 |
| 6,728,300 | B1 * | 4/2004 | Sarkar et al. ............. 375/147 |
| 6,782,250 | B2 * | 8/2004 | Rainish et al. .......... 455/343.2 |
| 6,889,055 | B1 * | 5/2005 | Neufeld ................. 455/458 |
| 6,985,453 | B2 * | 1/2006 | Lundby et al. ............ 370/311 |
| 7,006,468 | B1 * | 2/2006 | Chen et al. .............. 370/330 |
| 7,020,102 | B2 * | 3/2006 | Tuomainen et al. ........ 370/311 |
| 7,035,234 | B2 * | 4/2006 | Toskala et al. ........... 370/329 |

FOREIGN PATENT DOCUMENTS

EP    1 081 976 A2    3/2001

OTHER PUBLICATIONS

"Universal Mobile Telecommunications System (UMTS); Physical channels and mapping of transport channels onto physical channels (FDD)", (3GPP TS 25.211 version 5.0.0 Release 5) ETSI TS 125 211 V5.0.0., Mar. 2002, XP-002229618, (pp. 1-50).
Kokkoraki, A., Standard Search Report as prepared by the European Patent Office, completed Jan. 31, 2003 (3 pgs.).
ETSI; Chapter 6, WCDMA; www.privateline.com/3G/WCDMA.pdf: pp. 171-205.
ETSI; Chapter 6, WCDMA; www.privateline.com/3G/WCDMA.pdf: pp. 171-205, Mar. 2002.

* cited by examiner

*Primary Examiner*—Wing F. Chan
*Assistant Examiner*—Michael J Moore, Jr.

(57) ABSTRACT

A method and apparatus for detecting a periodic message in a mobile communication system includes initiating, at a receiver, a reception of synchronization data a predetermined amount of time prior to a current periodic message. The predetermined amount of time is based on at least one of an estimated signal quality value from at least one prior periodic message and an estimated error in the at least one prior periodic message. The synchronization data is used to achieve synchronization, and the current periodic message is detected based on the synchronization.

22 Claims, 7 Drawing Sheets

FIG. 7

METHOD AND APPARATUS FOR MINIMIZING TIME OF RECEPTION DURING PAGING

BACKGROUND OF THE INVENTION

1. Technical Field of the Invention

The present invention relates in general to the synchronization of a receiver with a transmitter in a cellular radio communications system, and in particular to improving stand-by time of a mobile terminal by minimizing the time of reception during paging.

2. Description of Related Art

Code Division Multiple Access (CDMA) systems were developed to allow multiple users to share scarce radio communication resources. In CDMA systems, a number of users are allocated to the same frequency. To distinguish among signals for different users, each user is assigned a pseudo-noise spreading sequence, which a transmitter uses to spread a narrow-band information to a wide-band signal. To detect a CDMA signal, a conventional receiver despreads the received signal using the same spreading sequence that was used by the transmitter.

WCDMA is an improvement of the CDMA method and has been developed by various organizations around the world. Some of the benefits provided by WCDMA include support for increased bandwidth and bitrates, and provisions for improved packet data communications and other services.

An important consideration for mobile terminals in a communications system is that of stand-by time. Stand-by time of a mobile terminal represents the maximum battery life of a mobile terminal when not in use for a conversation. To increase the stand-by time of a mobile terminal, the power consumption when the mobile terminal is turned on but not in use should be minimized. Power consumption can be minimized by powering off different components in the mobile terminal, such as signal processing circuitry, when the mobile terminal is not in use. When the mobile terminal is idle, its main task is to monitor a paging data channel and respond to any pages received. The base station utilizes the paging channel to send out paging messages or notifications of incoming calls to the mobile terminals. To minimize the time the mobile terminal requires to demodulate the paging data channel, an additional channel denoted as the paging indicator channel is transmitted. The mobile terminal is required to monitor the paging indicator channel periodically to demodulate the paging indicator. During those periods when the mobile terminal is not required to monitor the paging indicator channel, the mobile terminal typically conserves power by powering off its receiver.

In WCDMA systems, synchronization of a mobile terminal with the base station is done using a common pilot channel, which transmits known pilot symbols in parallel to a paging indicator channel and a paging data channel. These various channels are separated by different orthogonal codes. To monitor the paging indicator channel, the mobile terminal must first synchronize its receiver with the base station through a process of carrier frequency correction and detection of the channel impulse response, or path profile. By powering up the receiver, de-spreading the received signal using a common pilot code, and using a path searcher, the mobile terminal can perform carrier frequency correction and identify the relevant radio paths. If the synchronization process including the path search is too short, the receiver will not be adequately synchronized with the base station, which can result in errors in detecting the paging indicator. On the other hand, by using a longer path search, a more accurate radio path estimate and thus better synchronization can be achieved. However, any excess time used during the path search implies that the mobile terminal has to be turned on for a longer period of time before the actual paging message is received, thereby reducing the stand-by time of the mobile terminal.

There is a need, therefore, for a method of minimizing the time of reception during paging when the mobile terminal is communicating in a paging mode while, at the same time, providing for sufficient synchronization to minimize errors in the detection of pages.

SUMMARY OF THE INVENTION

The present invention comprises a method and apparatus for reducing time of reception during paging in a cellular communication system.

In accordance with one embodiment of the invention, there is provided a method in which a plurality of paging messages are received by a receiver. An estimated signal quality value is determined from at least one of the plurality of paging messages received prior to a current paging message. The estimated signal quality value is utilized to determine a time period for receiving synchronization data and the receiver is activated during the time period for receiving synchronization data.

In accordance with another embodiment of the invention, reducing time of reception during paging is implemented in an apparatus that includes a receiver for receiving a plurality of paging messages. The apparatus includes a device for determining an estimated signal quality value from at least one of the plurality of paging messages received prior to a current paging message and a controller for determining a time period for receiving synchronization data based on the estimated signal quality value and for activating the receiver during the determined time period to receive the synchronization data. Preferably, the estimated signal quality value relates to an estimated signal-to-noise ratio (SNR) or a radio path profile estimate.

BRIEF DESCRIPTION OF THE DRAWINGS

For a more complete understanding of the present invention, reference is made to the following detailed description taken in conjunction with the accompanying drawings wherein.

DETAILED DESCRIPTION OF THE INVENTION

Reference is now made to the Drawings wherein like reference characters denote like or similar parts throughout the various figures. In a preferred embodiment, the present invention is implemented in a WCDMA system. Accordingly, the following description and examples focus primarily on the use of the invention in connection with a WCDMA system. As will be appreciated by persons of ordinary skill in the art, however, the invention can be used in other wireless communication systems having a paging indicator channel and a paging message channel with a separate pilot channel, such as CDMA and TDMA.

Figure 1:
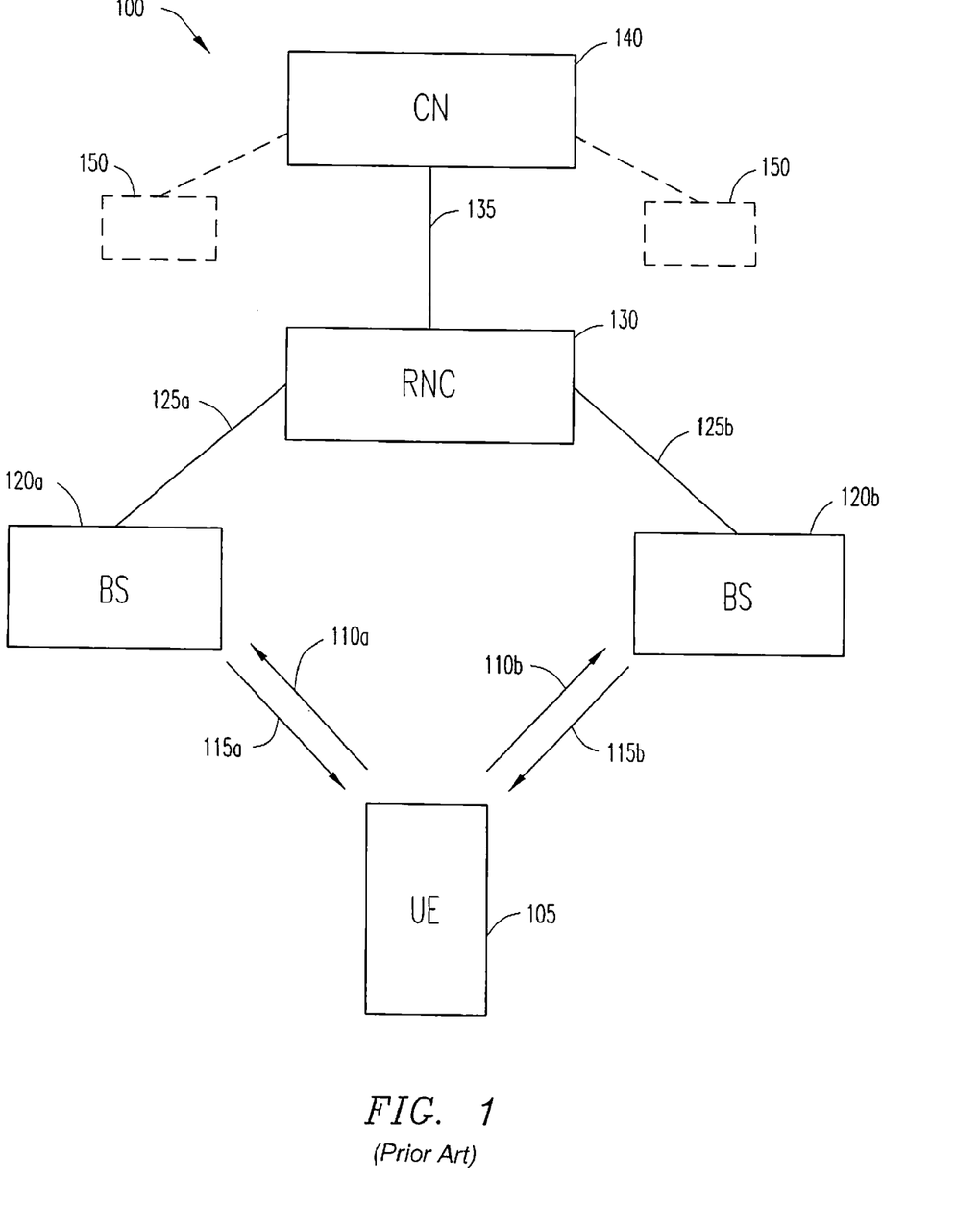
FIG. 1 is a block diagram of a conventional wireless WCDMA communication system, in which the present invention can be implemented.

Referring now to FIG. 1, there is illustrated a block diagram of a conventional wireless WCDMA communication system 100, in which the present invention can be implemented. User equipment (UE) 105, e.g., a mobile terminal, communicates with one or more base stations (BS) 120a and 120b. Each base station 120a and 120b serves a service area referred to as a cell. Communication from base stations 120a and 120b to the mobile terminal 105 is referred to as a downlink 115a and 115b, while communication from the mobile terminal 105 to the base stations 120a and 120b is referred to as an uplink 110a and 110b. Each base station 120a and 120b is connected via an interface 125a and 125b to a radio network controller (RNC) 130, which controls the functions of the base stations 120a and 120b. In addition, the radio network controller 130 is connected to a core network (CN) 140 using an interface 135. The core network 140 may provide a connection to other networks 150, such as public switched telephone networks (PSTN) or base stations of other wireless technologies, such as CDMA or TDMA.

To increase the stand-by time of a mobile terminal 105, a receiver of the mobile terminal 105, is deactivated when the mobile terminal 105 is not involved in a voice or data call connection. By powering off the receiver and other signal processing blocks to minimize current consumption, the stand-by time of the mobile terminal 105 can be increased. However, the mobile terminal 105 periodically monitors for page messages sent by the system on the paging channels. Such page messages are used to notify the mobile terminal 105 of any incoming calls. When the mobile terminal 105 receives a paging message indicating that the mobile terminal 105 is being paged, the mobile terminal 105 begins receiving control data from the radio network controller 130 via a base station 120. The mobile terminal 105 uses such control data for setting up a call connection.

Figure 2:
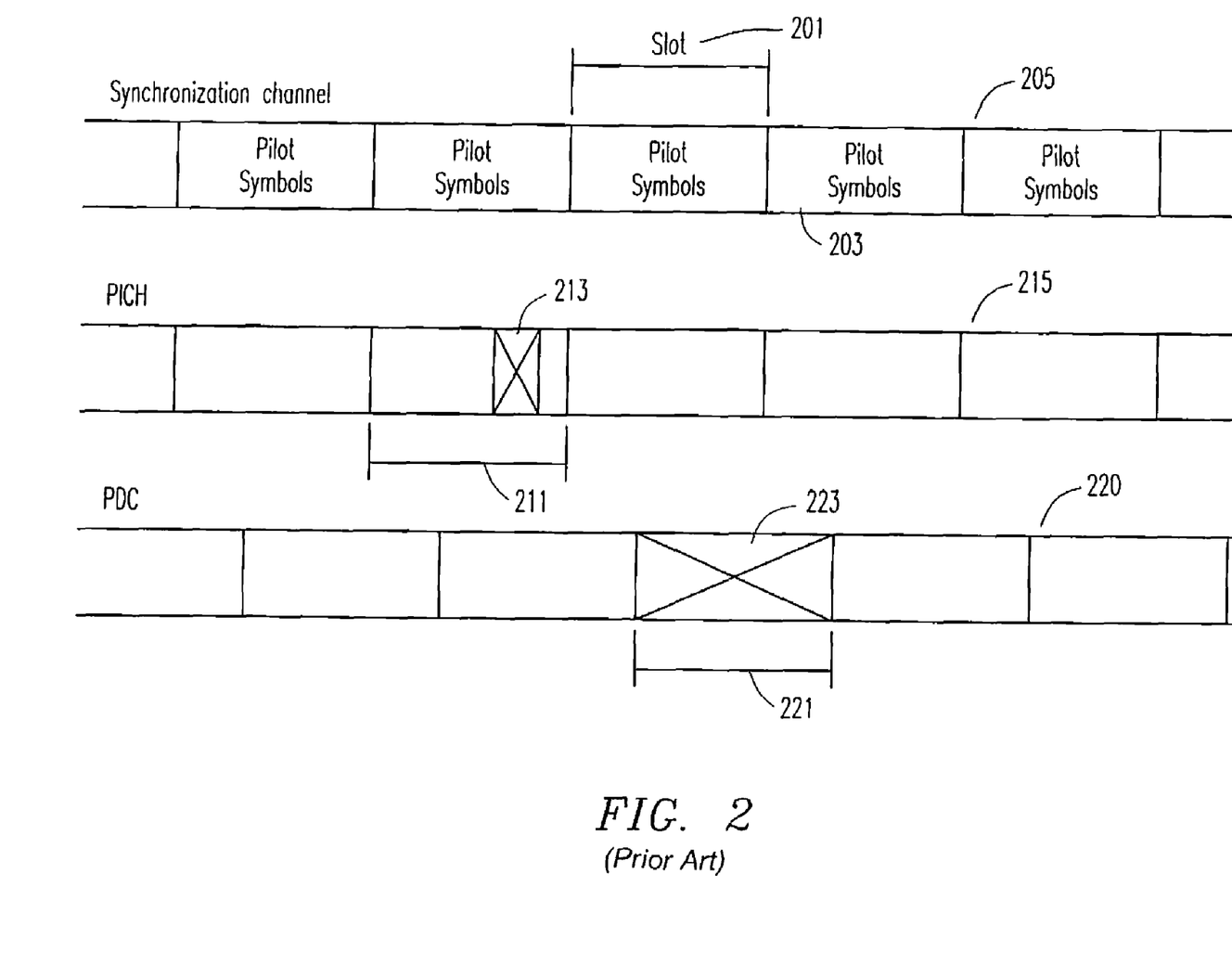
FIG. 2 illustrates conventional frame structures for communication channels in WCDMA communication system.

Referring now to FIG. 2, conventional frame and slot structures of communication channels in a WCDMA system used to monitor for paging signal are illustrated. Each slot 201 of a synchronization channel 205 includes a sequence of known pilot symbols 203 that convey timing and system configuration information to mobile terminals 105 in the cell served by the base station 120. System acquisition by the mobile terminal 105 begins by locating the synchronization channel 205, which permits the mobile terminal 105 to synchronize with the base station 120 through a process of path searching, carrier frequency correction, and channel estimation. Thus, by de-spreading a signal using known pilot symbols, and using a path searcher, the mobile terminal 105 can perform carrier frequency correction and identify the relevant radio paths.

In addition, a paging indicator channel 215, which is also subdivided into slots 211, transmits paging indicator messages to the mobile terminals 105 currently located in the cell. Each mobile terminal 105 is assigned a specific, recurring time period 213 in which the mobile terminal 105 listens for paging indicator messages. The assigned time period 213 for the mobile terminal 105 can be identified based on information previously received by the mobile terminal 105 on a broadcast channel (not shown) associated with the base station 120. Generally, each such time period 213 is assigned to a group of mobile terminals 105, and thus more than one mobile terminal 105 is listening for a paging indicator message at the same time.

Furthermore, a paging data channel (PDC) 220 includes slots 221 that transmit paging data messages 223. Generally, once a mobile terminal 105 detects a page based on a received paging indicator message, the mobile terminal 105 further receives an associated paging data message 223. The paging data message 223 allows the mobile terminal 105 to determine whether it actually has been paged or another mobile terminal from the paging group has been paged or, alternatively, whether there was an error in the detection of the paging indicator message. Assuming the mobile terminal 105 has been paged, the paging data message 223 contains control information for setting up a call connection. The synchronization channel 205, the paging indicator channel 215, and the paging data channel 220 share the same frequency bandwidth but are separated by different orthogonal codes.

Figure 3:
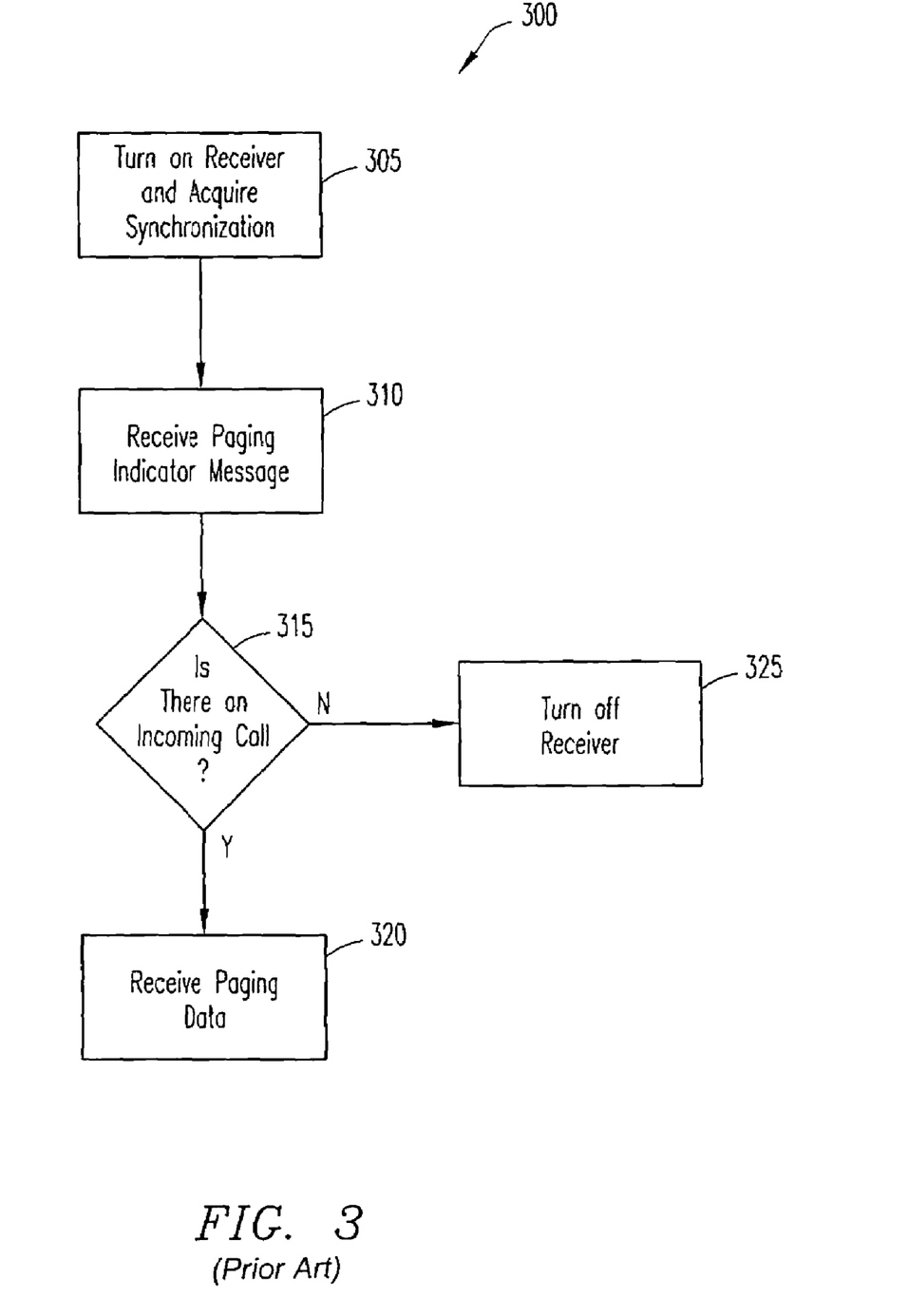
FIG. 3 is a flow diagram of a conventional procedure for receiving data by a mobile terminal while operating in paging mode.

Referring now to FIG. 3, there is shown a flow diagram of a conventional procedure 300 for receiving data by a mobile terminal 105 while operating in paging mode. In step 305, the mobile terminal 105 powers up its receiver and uses the synchronization channel to acquire synchronization with a base station transmitter. In step 310, the mobile terminal 105 receives a paging indicator message 213 on the paging indicator channel. The paging indicator channel transmits information indicating whether there is an incoming call for the mobile terminal 105. At step 315, the mobile terminal 105 uses the paging indicator to determine if a call is intended for the mobile terminal 105. If it is determined that a call is intended for the mobile terminal 105, the mobile terminal 105 starts to receive, on the paging data channel, control data needed to set up a connection at step 320. However, if the paging indicator message indicates that there is not an incoming call for the mobile terminal 105, the receiver within the mobile terminal 105 is turned off at step 325, and the mobile terminal 105 waits for the next paging indicator. As discussed above, the conventional procedure for receiving paging data by a mobile terminal 105 while operating in the paging mode requires a path search along with other synchronization operations. The longer the path search, the better the synchronization. However, a longer path search causes the receiver of the mobile terminal 105 to be turned on for a longer time before the actual paging message is received, thereby degrading the stand-by performance of the mobile terminal 105.

In accordance with the principles of the present invention, the stand-by time of a mobile terminal 105 can be improved by minimizing the time of reception while the mobile terminal 105 is communicating in a paging mode. Initially, it is noted that the time actually required to perform the path search in connection with synchronizing with the base station 120 is heavily dependent on the current signal-to-noise ratio. By utilizing an estimated signal-to-noise ratio, (SNR), or measure of signal strength relative to background noise, from at least one of a plurality of earlier paging messages, it is possible to predict approximately how much time is required to achieve synchronization. If the SNR of a particular signal is high, the time required for synchronization of a mobile terminal 105 with the base station 120 is short. However, if the SNR of a particular signal is low, communication is generally not as reliable unless steps are taken to increase the signal level or decrease the noise level. Hence, a longer time interval is required to achieve synchronization between the mobile terminal 105 and the base station 120. Thus, by utilizing the estimated signal-to-noise (SNR) as measured during at least one of the earlier paging messages, the stand-by time of a mobile terminal 105 can be prolonged by adjusting the amount of time the receiver is turned on in accordance with the estimated SNR.

In another embodiment of the present invention, the stand-by time of a mobile terminal 105 can be improved by utilizing information related to the path profile of the radio channel. As known in the art, radio channels are severely impacted by the presence of multipath propagation. In multipath propagation, the propagating signal is reflected from a number of objects in the physical environment, and the various multipath components from the different radio paths arrive at a receiving device at slightly different times due to the time delays associated with the multipath propagation. Generally, the difference between the shortest and longest time delays of the radio paths represents a delay spread. If the channel has a relatively small number of radio paths and a low delay spread associated therewith, the time interval needed to achieve synchronization between the mobile terminal 105 and the base station 120 is short. However, if the channel has a relatively higher number of radio paths and a larger delay spread, the time interval needed to achieve synchronization between the mobile terminal 105 and the base station 120 is longer. This information related to the number of radio paths and the size of the delay spread can be used to predict approximately how much time is required to achieve synchronization. Thus, by utilizing the path profile estimates determined during at least one of the earlier paging messages, the standby time of a mobile terminal 105 can be prolonged by adjusting the amount of time the receiver is turned on in accordance with the estimated path profiles.

Figure 4:
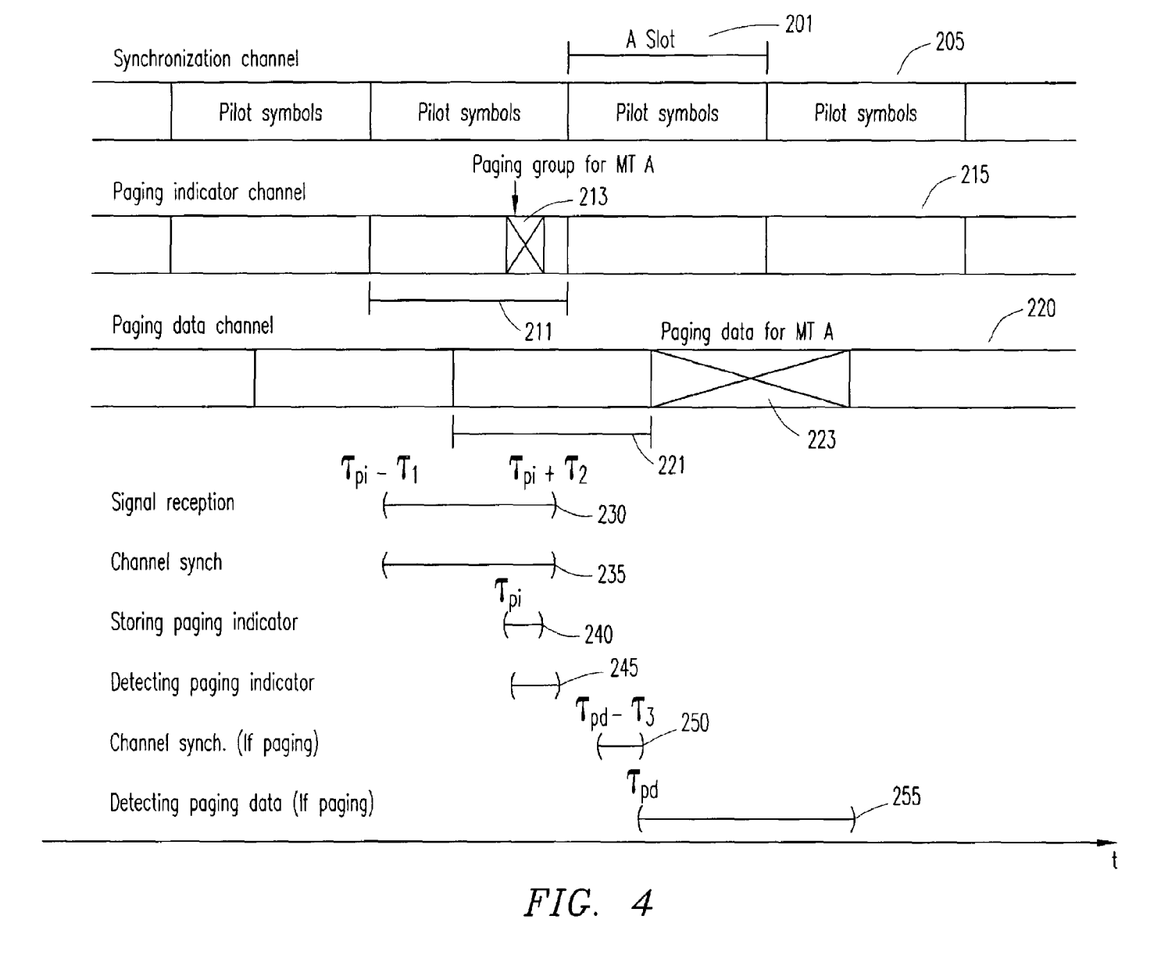
FIG. 4 is a diagram illustrating frame and slot structures of various communication channels in a WCDMA system along with the corresponding timing sequence for detection and synchronization of a paging signal in accordance with an embodiment of the present invention.

Referring now to FIG. 4, there is shown a diagram illustrating frame and slot structures of various communication channels in a WCDMA system along with the corresponding timing sequence for detection and synchronization of a paging signal in accordance with an embodiment of the present invention. In general, the frame and slot structures of the synchronization channel 205, the paging indicator channel 215, and the paging data channel 220 are identical to those shown and described in connection with FIG. 2. Pursuant to the present invention, however, the timing of receiver activation and detection is adjusted relative to information transmitted on the synchronization channel 205, paging indicator channel 215, and paging data channel 220.

When operating in paging mode, a paging group time instant $\tau_{pi}$, at which the mobile terminal 105 should listen on the paging indicator channel 215, is known from information previously received on a broadcast channel. Accordingly, based on an internal clock signal, the mobile terminal 105 turns on its receiver prior to the beginning of the paging group time instant $\tau_{pi}$. Pursuant to the present invention, the amount of time $\tau_1$ prior to the beginning of the paging group time instant $\tau_{pi}$ and the amount of time $\tau_2$ subsequent to the paging group time instant $\tau_{pi}$ during which the receiver is powered up are derived from signal-to-noise ratio estimates from earlier paging messages or, at the very beginning of the paging procedure, are predetermined based on some worst case scenario regarding the signal-to-noise ratio. The amount of time $\tau_1$ prior and the amount of time $\tau_2$ subsequent to the paging group time instant $\tau p_{pi}$ during which the receiver is powered up can also be derived from information related to the path profile estimates of the radio channel, such as the number of radio paths and the size of the delay spread. Thus, the receiver is turned on during a signal reception period 230 starting at $\tau_{pi}-\tau_1$ and ending at $\tau_{pi}+\tau_2$.

The mobile terminal 105 processes the signal received during the signal reception period 230 using the known pilot symbols to achieve synchronization during a first channel synchronization period 235. In addition, the received signal that includes the paging indicator is stored during a paging indicator interval 240 that begins at the known paging group time instant $\tau_{pi}$. The stored signal is then decoded using the appropriate paging indicator code and in accordance with the identified path profile and synchronization information to detect the paging indicator (as indicated at 245).

If the detected paging indicator indicates that the mobile terminal 105 is being paged, the mobile terminal 105 must again turn on its receiver to listen to a paging data message on the paging data channel. The paging data time instant $\tau_{pd}$, at which the mobile terminal should listen for the paging data message, is known either from system specifications or from the broadcast information in the particular cell. Here again, the amount of time $\tau_3$ prior to the beginning of the paging data time instant $\tau_{pd}$ at which the receiver is powered up is derived from the signal-to-noise ratio estimates, or from the path profile estimates, from earlier paging messages. During this second channel synchronization period 250, which begins at $\tau_{pd}-\tau_3$, the mobile terminal 105 refines the radio path profile identified during the first channel synchronization period 235. In some cases, the value of $\tau_3$ can be zero, meaning that the path profile estimate obtained from the first channel synchronization period 235 is good enough that further path searching is not needed. Finally, the paging data is detected (as indicated at 255) beginning at the known paging data time instant $\tau_{pd}$ and continuing until the paging data message 223 is fully received.

Figure 5:
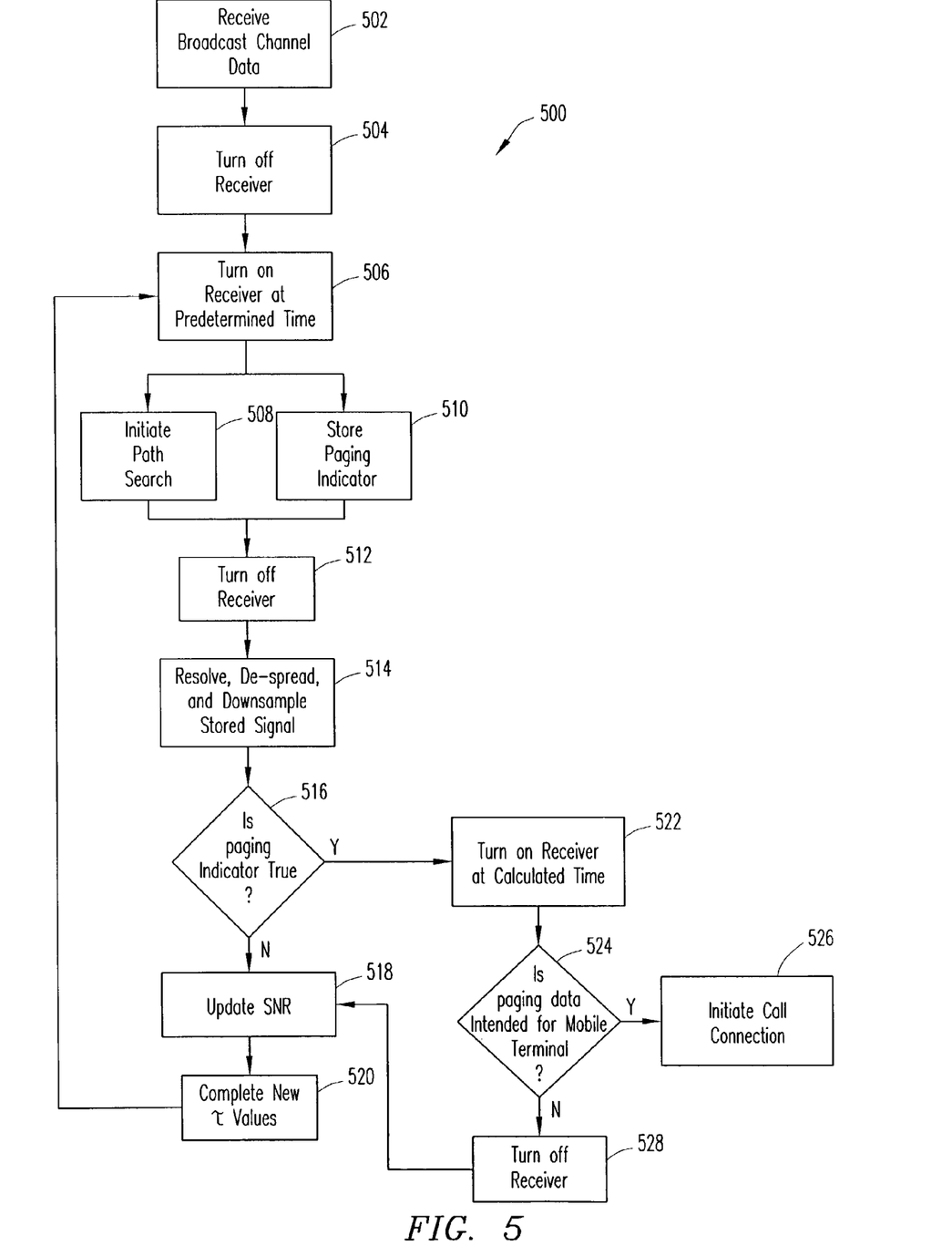
FIG. 5 is a flow diagram of a method for reducing time of reception during paging in accordance with principles of the present invention.

Referring now to FIG. 5, there is illustrated a flow diagram 500 of a method for reducing time of reception during paging in accordance with principles of the present invention. Although the steps of the method are depicted in a particular sequence, it will be appreciated by persons of ordinary skill in the art that certain steps of the method do not necessarily follow a strict sequence but can be rearranged and/or performed simultaneously. Upon entering a new cell or first powering up, the mobile terminal 105 receives broadcast channel data at step 502. The broadcast channel data can include information relating to paging, such as an indication of a recurring time instant $\tau_{pi}$ regarding when the mobile terminal 105 should listen on the paging indicator channel and an indication of a recurring time instant $\tau_{pd}$ regarding when to listen on the paging data channel. Once the necessary broadcast channel data is received, the receiver of the mobile terminal 105 is turned off at step 504 to conserve power. To determine whether the mobile terminal 105 is being paged, the receiver is turned on at step 506 to receive the paging indicator, which is sent at the paging indicator time instant $\tau_{pi}$. To allow time for the receiver to synchronize with the received signal, the receiver generally needs to begin receiving signals some length of time $\tau_1$ prior to $\tau_{pi}$. Initially, $\tau_1$ is set to some predetermined value based on a worst case scenario regarding the signal-to-noise ratio. Once the mobile terminal 105 has received at least one paging message, however, the value of $\tau_1$ is derived from signal-to-noise ratio estimates from earlier paging messages.

Once the receiver is turned on at step 506, the mobile terminal can initiate a path search at step 508 to correct the carrier frequency and estimate the path profile of the radio channel using the pilot symbols on the synchronization channel.

To provide as accurate of a path profile estimate as possible, the path search generally continues until after the paging indicator is received. During the path search, beginning at the paging indicator time instant $\tau_{pi}$, the received signal including the paging indicator message is stored at step 510. The receiver is turned off and the path search is discontinued in step 512 at some length of time $\tau_2$ after the paging indicator time instant $\tau_{pi}$. As with the value $\tau_1$, the value of $\tau_2$ is initially predetermined based on some worst case scenario and is subsequently derived from signal-to-noise ratio or path profile estimates from earlier paging messages. Then, at step 514, the path profile estimate and the paging indicator channel de-spreading code are used to resolve, de-spread, and downsample to symbol rate the stored signal.

At step 516, it is determined from the downsampled signal whether the paging indicator is true (i.e., whether the mobile terminal 105 is being paged). If not, the signal-to-noise ratio (SNR) is updated at step 518 based on data from the path search and/or the process of resolving, de-spreading, and downsampling, and new values of $\tau_1$, $\tau_2$, and $\tau_3$ are computed at step 520. On the other hand, if the paging indicator is true, the receiver must again be turned on to receive additional information relating to the page on the paging data channel. Accordingly, the receiver is turned on at step 522 a length of time $\tau_3$ prior to the known paging data time instant $\tau_{pd}$ to refine the radio path profile. The value of $\tau_3$ is derived from signal-to-noise ratio estimates from earlier paging messages.

Using the received paging data, it is determined if the paging data is actually intended for the mobile terminal 105 at step 524. If so, a call connection with the appropriate base station is initiated at step 526. If, on the other hand, the paging data indicates that paging data is not intended for the mobile terminal, the receiver is turned off at step 528, and the signal-to-noise ratio is updated at step 518. In this case, however, the indication that the paging indicator was true, followed by the indication that the paging data is not intended for the mobile terminal 105 implies that the detection of the paging indicator was erroneous. This error is used in place of and/or in addition to the updated signal-to-noise ratio estimates from the path search, the resolving, de-spreading, and downsampling process, and/or an estimate of channel characteristics to compute new values of $\tau_1$, $\tau_2$, and $\tau_3$ at step 520. Typically, the occurrence of such an error indicates that the time offsets $\tau_1$, $\tau_2$, and $\tau_3$ should be increased. Once the new values are computed, the process returns to step 506, wherein the mobile terminal 105 awaits the next recurring paging indicator time instant $\tau_{pi}$.

Figure 6:
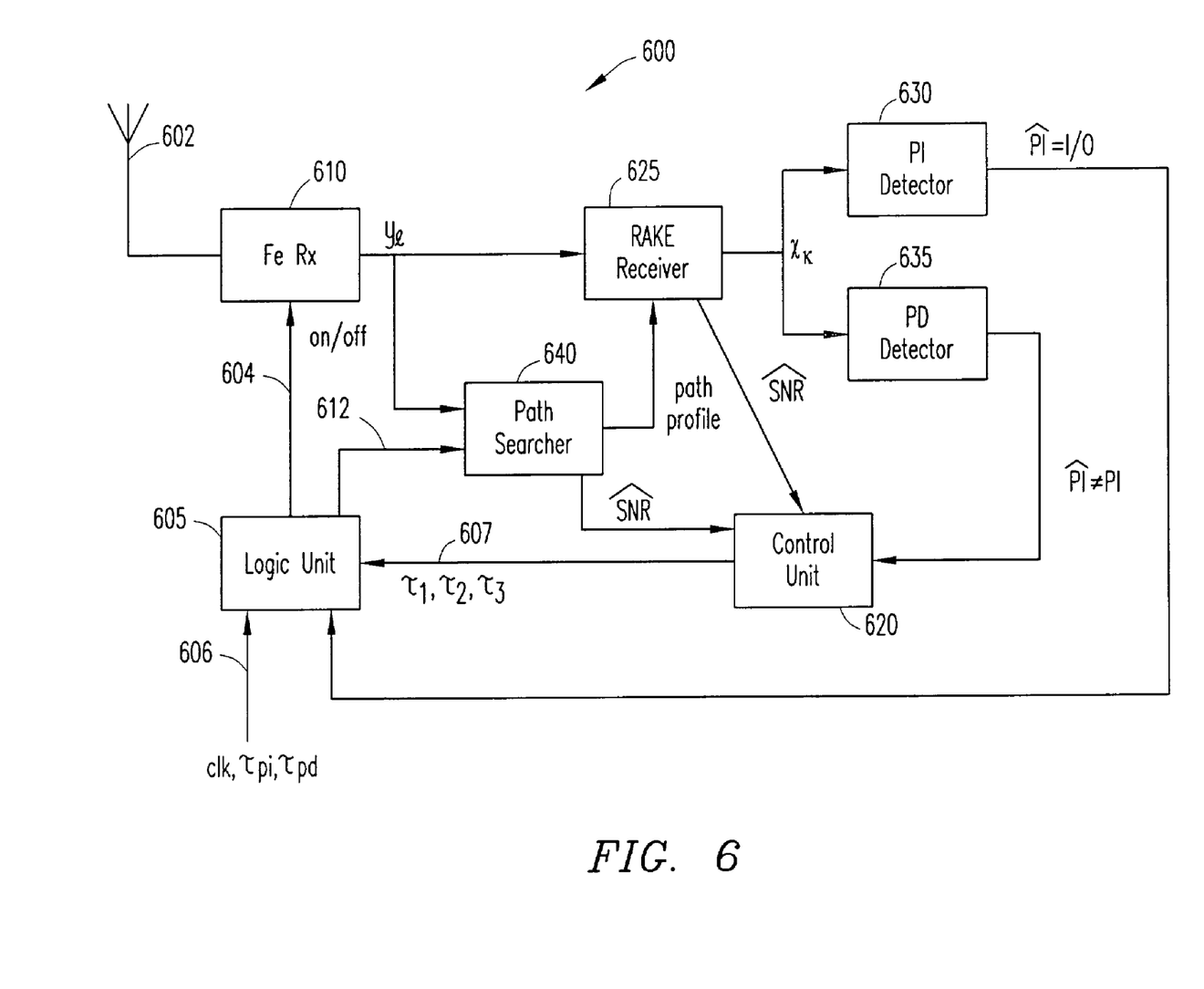
FIG. 6 is a block diagram of an apparatus for minimizing the time of reception of a WCDMA receiver in a mobile terminal during paging mode in accordance with an embodiment of the present invention.

Referring now to FIG. 6, there is illustrated an apparatus for minimizing the time of reception of a WCDMA receiver 600 in a mobile terminal 105 during paging mode in accordance with an embodiment of the present invention. The receiver 600 is turned off for a period of time when the mobile terminal 105 is not engaged in a call connection. During paging mode, the mobile terminal 105 has received information regarding the paging indicator time instant $\tau_{pi}$ and the paging data time instant $\tau_{pd}$. These time instants $\tau_{pi}$ and $\tau_{pd}$ along with a clock signal clk are provided to a logic unit 605 (as indicated at 606). In addition, time offsets $\tau_1$, $\tau_2$, and $\tau_3$ that indicate when to start and stop receiving data for performing synchronization are stored in a control unit 620 and provided to the logic unit 605 (as indicated at 607). As discussed above, these time periods $\tau_1$, $\tau_2$, and $\tau_3$ are generally derived from signal-to-noise ratio estimates from earlier paging messages.

The logic unit 605 uses the received value $\tau_1$, together with $\tau_{pi}$ to enable (as indicated at 604) a front end receiver (FeRx) 610 to begin receiving data at time $\tau_{pi}-\tau_1$ and to enable (as indicated at 612) a path searcher 640 to begin correcting the carrier frequency and estimating the path profile of the radio channel using a signal $y_l$ received by the front end receiver 610 via an antenna 602. The path searcher 640 may contain one or more correlators which continuously scans the time delay for a short period of time while looking for strong signals. The path searcher 640 provides the path profile estimate to a Rake receiver 625 and also generates an estimate ($\hat{SNR}$) of the signal-to-noise ratio, which is provided to the control unit 620. Beginning at the paging indicator time instant $\tau_{pi}$, the received signal $y_l$ including the paging indicator is stored in a memory in the Rake receiver 625. At time $\tau_{pi}+\tau_2$, the logic unit 605 disables the front end receiver 610 (as indicated at 604) and disables the path searcher 640 (as indicated at 640). The Rake receiver 625 uses the estimated path profile received from the path searcher 640 to resolve, de-spread, and downsample the stored signal.

As known in the art, the Rake receiver 625 remedies the effect of multipath propagation. The output $x_k$ from the receiver 625 is then provided to a paging indicator (PI) detector 630. The paging indicator detector determines whether there actually exists a paging signal for the mobile terminal 105 by determining whether the paging indicator is true ($\hat{PI}=1$) or false ($\hat{PI}=0$).

If the paging indicator detector 630 determines that no paging signal exists for the mobile terminal 105, the Rake receiver 625 provides a signal-to-noise ratio estimate to the control unit 620, and the control unit 620 computes new values of $\tau_1$, $\tau_2$, and $\tau_3$ based on the old values and the new signal-to-noise ratio estimates. Thus, the logic unit 605 disables the front end receiver 610 until the next synchronization period before the next paging indicator message (i.e., until the next occurrence of $\tau_{pi}-\tau_1$). However, if the paging indicator detector 630 determines that there is paging of the mobile terminal 105, the logic unit 605 uses the time offset $\tau_3$, along with the paging data time instant $\tau_{pd}$ to enable both the front end receiver 610 and the path searcher 640 for refining of the radio path profile. As mentioned above, the time offset $\tau_3$ can be zero in cases where the estimated path profile from the synchronization for the paging indicator is of sufficient quality that further path searching is unnecessary. At time $\tau_{pd}$, the path searcher 640 is disabled, and the Rake receiver 625 resolves, despreads, and downsamples the received signal $y_l$ to generate an output $x_k$. A paging data detector 635 starts to detect the paging data from the signal $x_k$. If the paging data confirms that the mobile terminal 105 is being paged, a call connection is established between the mobile terminal 105 and the base station 120.

On the other hand, if the paging data was not intended for the mobile terminal 105, i.e., $\hat{PI} \neq PI$, the front end receiver 610 is disabled, and the control unit 620 updates the values $\tau_1$, $\tau_2$, and $\tau_3$ using the estimated signal-to-noise ratio from the path searcher 640, the estimated signal-to-noise ratio from the Rake receiver 625, and/or information regarding the erroneous detection of a paging indicator.

Figure 7:
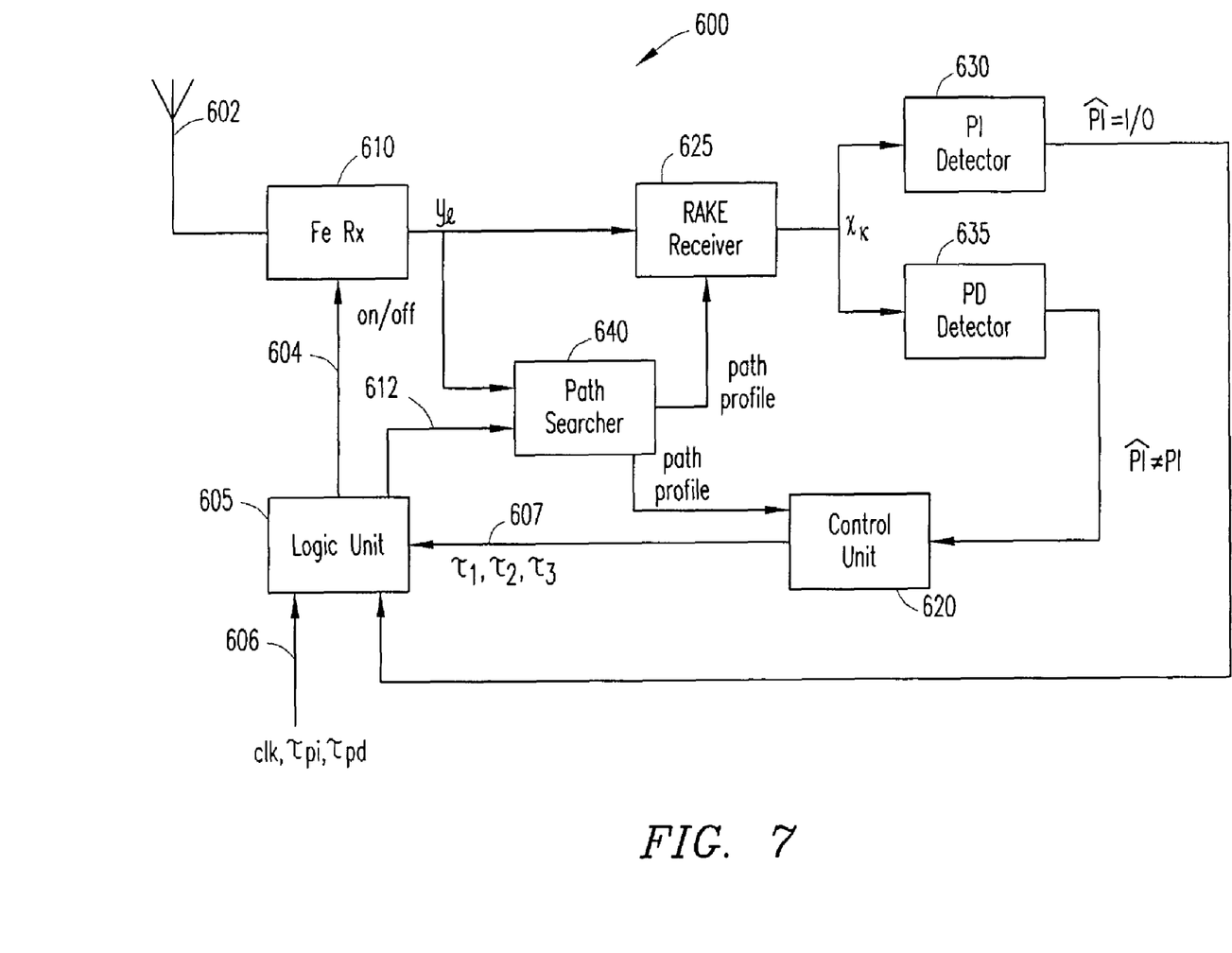
FIG. 7 is a block diagram of an apparatus for minimizing the time of reception of a WCDMA receiver in a mobile terminal during paging mode in accordance with another embodiment of the present invention.

Referring now to FIG. 7, there is illustrated an apparatus for minimizing the time of reception of a WCDMA receiver 600 in a mobile terminal 105 during paging mode in accordance with another embodiment of the present invention. The apparatus operates in a similar manner as discussed earlier with respect to FIG. 6. However, in accordance with this embodiment of the present invention, the time offsets $\tau_1$, $\tau_2$, and $\tau_3$ that indicate when to start and stop receiving data for performing synchronization are generally derived from path profile estimates of the radio channel determined by the path searcher 640. The path searcher 640 provides an estimate of the path profile to a control unit 620. The control unit 620 then computes values of $\tau_1$, $\tau_2$, and $\tau_3$ based on characteristics of the estimated path profile, such as the number of detected paths, the delay spread among the various paths, and the like. These time offset values are fed to the logic unit 605, which activates and deactivates the receiver 610 based on the computed time offset values.

As will be appreciated by those of ordinary skill in the art, the time offset values $\tau_1$, $\tau_2$, and $\tau_3$ can also be computed in the control unit 620 based on a combination of two or more of the estimated signal-to-noise ratio from the path searcher 640, the estimated signal-to-noise ratio from the Rake receiver 625, information regarding any erroneous detection of a paging indicator, and the characteristics of the estimated path profile.

Although a preferred embodiment of the method and apparatus of the present invention has been illustrated in the accompanying Drawings and described in the foregoing Detailed Description, it is understood that the invention is not limited to the embodiment disclosed, but is capable of numerous rearrangements, modifications, and substitutions without departing from the spirit of the invention as set forth and defined by the following claims.

What is claimed is:

1. A method in a mobile terminal for reducing time of reception during paging in a communication system, said method comprising the steps of:
    receiving a first paging-related signal
    determining an estimated signal quality value based on measurements of the first paging-related signal;
    determining a time period required to receive synchronization data, said time period varying in length based on the estimated signal quality value of the first paging-related signal, wherein a shorter time period is determined for a higher estimated signal quality value;
    activating the receiver at the beginning of the determined time period;
    receiving a second paging-related signal containing the synchronization data;
    deactivating the receiver at the end of the determined time period;
    synchronizing the receiver with the received second paging-related signal based on the synchronization data;
    for each subsequent paging-related signal, determining by the mobile terminal a new time period required to receive the synchronization data based on an estimated signal quality value of at least one previous paging-related signal; and
    activating the receiver only for the new time period when receiving each subsequent paging-related signal;
    wherein the mobile terminal adjusts its active time period relative to the transmitted synchronization data while timing and frame structures of synchronization and paging channels remain the same.

2. The method of claim 1, wherein the first paging-related signal comprises a paging indicator message transmitted on a paging indicator channel.

3. The method of claim 1, wherein the first paging-related signal comprises a paging data message transmitted on a paging data channel.

4. The method of claim 1, wherein the estimated signal quality value comprises an estimate of a signal-to-noise ratio (SNR).

5. The method of claim 1, wherein the estimated signal quality value corresponds to a radio path profile estimate.

6. The method of claim 1, wherein the step of determining a time period required to receive synchronization data based on the estimated signal quality value includes utilizing by the mobile terminal the estimated signal quality value from at least one of the plurality of earlier paging signals to predict the time period required to receive synchronization data.

7. The method of claim 5, wherein the step of determining a time period required to receive synchronization data based on the estimated signal quality value includes utilizing by the mobile terminal the path profile estimate from at least one of the plurality of earlier paging messages to predict the time period required to receive synchronization data.

8. An apparatus in a mobile terminal for reducing time of reception during paging in a communication system, said apparatus comprising:
    a receiver for receiving a plurality of paging-related signals;
    a device for determining an estimated signal quality value from at least one of the plurality of paging-related signals received prior to receiving a current paging-related signal;
    a controller for determining a time period required to receive synchronization data in the current paging-related signal, wherein the time period is based on the estimated signal quality value of the previously received paging-related signals, and for activating the receiver only during the time period to receive the synchronization data, wherein the controller determines a shorter time period for a higher estimated signal quality value; and
    means for synchronizing the receiver with the current paging-related signal based on the synchronization data;
    wherein the controller includes means for determining, for each subsequent paging-related signal, a new time period required to receive the synchronization data based on an estimated signal quality value of at least one previous paging-related signal, and to activate the receiver only for the new time period when receiving each subsequent paging-related signal;
    wherein the mobile terminal adjusts its active time period relative to the transmitted synchronization data while timing and frame structures of synchronization and paging channels remain the same.

9. The apparatus of claim 8, further comprising a path searcher for detecting the synchronization data.

10. The apparatus of claim 8, wherein the estimated signal quality value comprises an estimate of a signal-to-noise ratio (SNR).

11. The apparatus of claim 9, wherein the estimated signal quality value corresponds to a radio path profile estimate.

12. The apparatus of claim 9, further comprising a rake receiver for de-spreading the current paging-related signal.

13. The apparatus of claim 8, further comprising a rake receiver for de-spreading the current paging-related signal.

14. The apparatus of claim 8, wherein the communication system comprises a WCDMA system.

15. The apparatus of claim 8, wherein the controller includes means for determining a time period required to receive synchronization data based on the estimated signal quality value by utilizing the estimated signal quality value from at least one of the plurality of earlier paging messages to predict the time period required to receive synchronization data.

16. The apparatus of claim 11, wherein the controller includes means for determining a time period required to receive synchronization data based on the estimated signal quality value by utilizing the path profile estimate from at least one of the plurality of earlier paging messages to predict the time period required to receive synchronization data.

17. A method in a mobile terminal for detecting a periodic message in a mobile communication system, comprising the steps of:
- determining a time period required to receive synchronization data, said time period varying in length based on an estimated signal quality value of a previously received message, wherein a shorter time period is determined for a higher estimated signal quality value;
- activating a receiver at the beginning of the determined time period;
- initiating reception of the synchronization data a determined amount of time prior to the beginning of a current periodic message, said determined amount of time prior to the beginning of the current periodic message being based on the determined time period required to receive synchronization data;
- stopping the reception of the synchronization data a determined amount of time after the end of the current periodic message, said determined amount of time after the end of the current periodic message being based on the determined time period required to receive synchronization data;
- using the synchronization data to achieve synchronization; and
- detecting the current periodic message based on the synchronization;
- wherein the mobile terminal adjusts its active time period relative to the transmitted synchronization data while timing and frame structures of synchronization and paging channels remain the same.

18. The method of claim 17, wherein the estimated signal quality value of the previously received message comprises at least one of:
- an estimated signal-to-noise ratio (SNR) from at least one prior periodic message;
- an estimated error in the at least one prior periodic message; and
- an estimated radio path profile from the at least one prior periodic message.

19. The method of claim 17, wherein the step of using the synchronization data comprises at least one of correcting a carrier frequency and estimating radio channel characteristics.

20. The method of claim 17, wherein the current periodic message and the at least one prior periodic message comprise paging messages.

21. The method of claim 20, wherein the current paging message comprises a paging indicator message.

22. The method of claim 21, wherein, if the paging indicator message indicates a page, the method further comprises the steps of:
- initiating a reception of new synchronization data a predetermined amount of time prior to a paging data message, said predetermined amount of time prior to the paging data message being based on at least one of an estimated signal-to-noise ratio, estimated channel characteristics, an estimated paging detection error, and an estimated radio path profile;
- refining the synchronization using the received new synchronization data; and
- detecting the paging data message.

* * * * *